(12) United States Patent
Burckbuchler, Jr.

(10) Patent No.: US 7,856,946 B2
(45) Date of Patent: *Dec. 28, 2010

(54) METHOD OF PRODUCING CLUMPING ANIMAL LITTER COMPOSITION AND THE COMPOSITION

(75) Inventor: Frederick V. Burckbuchler, Jr., Jupiter Farms, FL (US)

(73) Assignee: Nature's Earth Products, Inc., West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,650

(22) Filed: Apr. 20, 2009

(65) Prior Publication Data
US 2009/0229529 A1 Sep. 17, 2009

Related U.S. Application Data

(60) Continuation of application No. 11/962,797, filed on Dec. 21, 2007, now Pat. No. 7,527,019, which is a division of application No. 11/049,140, filed on Feb. 1, 2005, now Pat. No. 7,331,309.

(51) Int. Cl.
*A01K 29/00* (2006.01)
(52) U.S. Cl. .................................................. 119/171
(58) Field of Classification Search .......... 119/171–173
See application file for complete search history.

(56) References Cited

U.S. PATENT DOCUMENTS

| | | | | |
|---|---|---|---|---|
| 3,921,581 A | * | 11/1975 | Brewer | 119/173 |
| 3,941,090 A | | 3/1976 | Fry | |
| 4,129,094 A | | 12/1978 | Stockel | |
| 4,157,696 A | * | 6/1979 | Carlberg | 119/172 |
| 4,258,859 A | | 3/1981 | Westphal | |
| 4,305,345 A | | 12/1981 | Otoguro | |
| 4,405,354 A | * | 9/1983 | Thomas et al. | 71/21 |
| 4,532,890 A | * | 8/1985 | Ohki et al. | 119/172 |
| 4,560,527 A | | 12/1985 | Harke et al. | |
| 4,607,594 A | | 8/1986 | Thacker | |
| 4,676,196 A | * | 6/1987 | Lojek et al. | 119/172 |
| 4,685,420 A | * | 8/1987 | Stuart | 119/173 |
| 4,788,936 A | | 12/1988 | Billings | |
| 4,794,022 A | | 12/1988 | Johnson et al. | |
| 4,883,021 A | * | 11/1989 | Ducharme et al. | 119/171 |
| 4,949,672 A | | 8/1990 | Ratcliff et al. | |
| 5,014,650 A | * | 5/1991 | Sowle et al. | 119/171 |
| 5,016,568 A | | 5/1991 | Stanislowski et al. | |
| 5,044,324 A | | 9/1991 | Morgan et al. | |
| 5,101,771 A | * | 4/1992 | Goss | 119/173 |

(Continued)

FOREIGN PATENT DOCUMENTS

DE 20017395 3/2002

(Continued)

*Primary Examiner*—Thomas Price
(74) *Attorney, Agent, or Firm*—McHale & Slavin, P.A.

(57) ABSTRACT

The instant invention is directed towards a method of preparing a clumping animal litter comprising a combination of a high molecular weight polymer, a gum, and cellulosic components. The invention particularly relates to a method of preparing a clumping animal litter that comprises a homogenous mixture of anionic polyacylamide, a guar gum, grist and optionally cellulosic fines in combination with one or more sources of cellulosic material, thereby providing a litter with enhanced absorption, clumping size and hardness.

18 Claims, 1 Drawing Sheet

U.S. PATENT DOCUMENTS

| | | | |
|---|---|---|---|
| 5,152,250 A | 10/1992 | Loeb | |
| 5,176,107 A | 1/1993 | Buschur | |
| 5,183,010 A | 2/1993 | Raymond et al. | |
| 5,183,655 A * | 2/1993 | Stanislowski et al. | 424/76.6 |
| 5,188,064 A | 2/1993 | House | |
| 5,193,489 A * | 3/1993 | Hardin | 119/173 |
| 5,195,465 A | 3/1993 | Webb et al. | |
| 5,207,830 A * | 5/1993 | Cowan et al. | 106/672 |
| 5,216,980 A | 6/1993 | Kiebke | |
| 5,271,355 A | 12/1993 | Billings | |
| 5,329,880 A * | 7/1994 | Pattengill et al. | 119/171 |
| 5,339,769 A * | 8/1994 | Toth et al. | 119/173 |
| 5,359,961 A * | 11/1994 | Goss et al. | 119/173 |
| 5,421,291 A | 6/1995 | Lawson et al. | |
| 5,526,770 A | 6/1996 | Kiebke | |
| 5,526,771 A | 6/1996 | Ito | |
| 5,577,463 A * | 11/1996 | Elazier-Davis et al. | 119/173 |
| 5,609,123 A * | 3/1997 | Luke et al. | 119/173 |
| 5,655,480 A | 8/1997 | Steckel | |
| 5,664,523 A | 9/1997 | Ochi et al. | |
| 5,762,023 A * | 6/1998 | Carter | 119/173 |
| 5,806,462 A | 9/1998 | Parr | |
| 5,860,391 A | 1/1999 | Maxwell et al. | |
| 5,901,661 A * | 5/1999 | Pattengill et al. | 119/173 |
| 5,927,049 A * | 7/1999 | Simard | 53/428 |
| 5,970,916 A * | 10/1999 | Yoder et al. | 119/173 |
| 6,029,395 A | 2/2000 | Morgan | |
| 6,029,603 A | 2/2000 | Evans et al. | |
| 6,039,004 A | 3/2000 | Goss et al. | |
| 6,053,125 A | 4/2000 | Kory et al. | |
| 6,076,299 A | 6/2000 | Spittle et al. | |
| 6,089,189 A * | 7/2000 | Goss et al. | 119/173 |
| 6,089,190 A | 7/2000 | Jaffee et al. | |
| 6,098,569 A | 8/2000 | Kent et al. | |
| 6,148,768 A * | 11/2000 | Ochi et al. | 119/172 |
| 6,206,947 B1 | 3/2001 | Evans et al. | |
| 6,216,634 B1 | 4/2001 | Kent et al. | |
| 6,294,118 B1 | 9/2001 | Huber et al. | |
| 6,360,478 B1 | 3/2002 | Spittle | |
| 6,371,050 B1 | 4/2002 | Mochizuki | |
| 6,405,677 B2 | 6/2002 | McPherson et al. | |
| 6,568,349 B1 * | 5/2003 | Hughes et al. | 119/171 |
| 6,662,749 B1 * | 12/2003 | Wiedenhaft et al. | 119/172 |
| 6,688,038 B1 | 2/2004 | Paternoster et al. | |
| 6,745,720 B2 | 6/2004 | Rasner et al. | |
| 6,837,181 B2 | 1/2005 | Schulein, Jr. et al. | |
| 6,868,802 B2 | 3/2005 | McPherson et al. | |
| 6,895,896 B1 | 5/2005 | Bloomer | |
| 7,124,710 B2 | 10/2006 | Weaver | |
| 2002/0038633 A1 | 4/2002 | Hayakawa | |

FOREIGN PATENT DOCUMENTS

| | | |
|---|---|---|
| DE | 20017396 | 3/2002 |
| EP | 0165820 | 12/1985 |
| EP | 0407064 | 1/1991 |
| EP | 0585928 | 3/1994 |

* cited by examiner

METHOD OF PRODUCING CLUMPING ANIMAL LITTER COMPOSITION AND THE COMPOSITION

RELATED APPLICATIONS

This application is a continuation of U.S. patent application Ser. No. 11/962,797, filed on Dec. 21, 2007 now U.S. Pat. No. 7,527,019, and entitled "METHOD OF PRODUCING CLUMPING ANIMAL LITTER COMPOSITION AND THE COMPOSITION" which is a divisional of U.S. patent application Ser. No. 11/049,140, filed Feb. 1, 2005 and entitled "CLUMPING ANIMAL LITTER COMPOSITION AND METHOD OF PRODUCING THE SAME", now U.S. Pat. No. 7,331,309, issued Feb. 19, 2008, the contents of each of which are incorporated in their entirety herein by reference.

FIELD OF THE INVENTION

This invention relates to a clumping animal litter comprising a homogenous mixture of a polymer, a gum and cellulosic components and methods of preparation thereof; particularly, an animal litter which comprises a homogenous mixture of anionic polyacylamide, guar gum, a grist and optionally cellulosic fines in combination, thereby providing a litter with enhanced absorption, clumping size and hardness.

BACKGROUND OF THE INVENTION

Methods and compositions are known that utilize absorbent materials in litter boxes and animal cages in an effort to efficiently and effectively collect animal urine and/or feces. Currently, there are generally two types of consists of an absorbent particulate material, which acts to absorb animal dross until the material reaches a saturation point, at which time the litter must be replaced. Unfortunately, without chemical additives, until the saturation point is reached the soiled absorbent material can grow mold and/or emit an objectionable odor requiring frequent replacement with fresh litter.

Clumping types of litter are currently the most popular litter on the market. In this type, the portion of the wetted granular litter forms a solid agglomerate, or clump, usually within a short period of time. This clump can then be easily removed while the rest of the granular litter remains.

Clay is currently the most commonly used absorbent material in both clumping and non-clumping types of animal litter, as it is able to absorb a substantial amount of liquid. However, due to the costs associated with mining and shipping of clays, litters made from this material tend to be more expensive and environmentally destructive than that produced from organic wood-based sources such as sawdust, waste paper, pulp, husks, wood pellets and the like. Furthermore, clays contain silica, a known carcinogen. Thus, the use of silica containing compounds raises health concerns for both the animal involved and the person changing the litter. Moreover, clumps of clay do not readily break down in water and may clog household plumping.

U.S. Pat. No. 5,927,049 to the present inventors (herein incorporated by reference in its entirety) has effectively solved these problems utilizing a simple and elegant procedure for the creation of a non-clumping, all-natural litter that is biodegradable, odor controlling, dustless, smooth throughout continued handling and capable of absorbing 5 times more fluid than clay. In particular, this invention exploits the odor neutralizing properties inherent in southern yellow pine, which eliminate volatile odors (e.g. mercaptan, amines, skatole gases) emitted from animal waste without the need for additional artificial additives.

While much of the prior art discloses the use of organic wood-based sources as a preferred or alternative embodiment, until the advent of the aforementioned method to the instant inventors few manufactures have been able to create a wood-based particulate litter that is economical to produce. These wood-based animal litters are expensive to fabricate, as they are often difficult to manufacture. Wood-based litters typically require multiple applications of aqueous additives (e.g. biocides, deodorizers, pesticides and the like), followed by a drying step in order to create litters with the desired properties.

Thus, what is lacking in the prior art is a clumping animal litter with superior absorbance and enhanced clumping properties that remains intact under mechanical stress, yet economical to produce and inhibits mold growth. Ideality the animal litter composition would use industrial or agricultural byproducts, thereby providing an economical and environmental friendly litter that is able to readily disperse when disposed into the household plumbing system.

DESCRIPTION OF THE PRIOR ART

Recently a variety of methods and procedures have been described in the prior art for preparing animal litters utilizing superabsorbent polymers in combination with both inorganic and organic substrates and mixtures of both. Many patents have been directed toward a clumping litter that forms agglomerates quickly and with sufficient mechanical integrity and size so as to permit easy removal of animal waste in a solid mass.

For example, U.S. Pat. No. 5,609,123 to Luke et al describes a pet litter composition comprising a particulate substrate with a low absorptive capacity, preferably a non-swelling clay, having bonded onto its surface fine particulate particles coated with a superabsorbent polymeric material and another particulate "clumping particle" to promote clumping. The superabsorbent polymer is an anionic polymer, preferably formed from a blend of carboxylic acid monomers, e.g. (meth)acrylic acid from 10 to 100% weight and (meth) acrylamide monomers from 0 to 90% weight. Unlike the high molecular weight, water soluble, anionic polymer utilized in the present invention, the superabsorbent polymer of Luke et al is a water insoluble, cross-linked polymeric material. Additionally, the manufacturing process of Luke et al requires that the surface of the substrate particle be sprayed first with a specific amount of liquid and allowed to absorb into the substrate particles, before application of the superabsorbent polymer and clumping particle blend. Too much liquid can cause undesirable swelling that can interfere with the beneficial performance of the superabsorbent polymer and clumping particles.

U.S. Pat. No. 6,148,768 to Ochi et al describes a pet litter for disposal of animal wastes, which comprise granular bodies containing fiber and a superabsorbent polymer skin layer. The granular body is composed of a core containing the fiber and a skin layer, which covers the core. The skin layer preferably contains an anti-powdering agent and superabsorbent polymer, such as a cross-linked polyacrylic acid. The patent fails to teach or suggest the use of a gum or gum derivatives on the granular body.

U.S. Pat. No. 4,157,696 to Carlberg describes an animal waste absorbent and deodorizing composition for use as an animal litter. The composition comprises pellets made from fly ash and cellulose fibers that form channels from the surface of the pellet to the interior of the pellet to permit capillary action to draw the dross into the interior of the pellet to deodorize and dehydrate the waste. Various pelletizing aids may be used, such as the synthetic polymer formed from sodium acrylate and acrylamide.

U.S. Pat. No. 6,662,749 to Wiedenhaft et al discloses an animal litter comprising a cellulosic substrate coated with an inner coating composed of an absorbent polyacrylate or acrylate copolymers and a second outer coating of guar gum, the binding agent used to form the aggregate. The particularly preferred polyacrylate is sold under the name Spinks 211 (H.C. Spinks Clay Company, Inc. located in Paris, Tenn.). However, unlike the instant invention, this animal litter requires the stepwise addition of an inner coating of an absorbent polymer onto the substrate with an outer coating of guar. Thus, the inner coating of polymer can only exhibit its absorbent properties when the liquid penetrates the outer coating of guar gum, which can disrupt the formation of the aggregate.

None of abovementioned prior art teach or suggest the use of a homogenous mixture of an absorbent polymer, a gum, grist and optionally cellulosic fines, to provide a clumping litter with improved clumping ability and absorbency. Thus, there remains a continuing need in the art for a clumping litter that forms a mechanically stable and absorbent agglomerate that is easy to manufacture.

DEFINITIONS

The term "anionic polyacrylamides", as used in the present specification and claims, is intended to mean a group of water soluble, high charge density, high molecular weight macromolecules with a molecular weight of at least 5,000,000 to 30,000,000; preferably at least about 10,000,000.

The term "grist" as used in the instant specification and claims is intended to mean the milled cellulosic material produced prior the formation of the pellet during the pelletization process. The grist can be comprised of one or more sources of softwoods, e.g. pine, cedar, fir, spruce and combinations thereof, since these materials have been found to innately contain odor-neutralizing and microbial resistant properties. Moreover, the grist can be obtained in any form such as wood chips, husks, hulls, shavings or sawdust, straw and combinations thereof, preferably from materials reclaimed from outside processes (i.e. lumber yard).

The terms "cellulosic fines" and "densified wood saw dust", are both used interchangeably in the instant specification and claims and are intended to mean the byproducts produced during the pelletization process or the superfluous cellulosic material generated during the manufacture of lumber or paper products which pass through at least one 10 to 30 mesh (U.S. Standard) screen. The cellulosic fines can include, among other things, small pellet pieces and any grist that did not form into proper pellets.

The term "near instantaneous" as used in the instant specification and claims, is intended to mean a period of time of less than 2 minutes.

The term "clump hardness" as used in the instant specification and claims, refers to the adhesiveness created by the homogenous mixture which allows the clump to remain substantially intact after being dropped from a height of one foot 5 minutes after formation of the clump.

SUMMARY OF THE INVENTION

In order to overcome the problems encountered by the prior art, the instantly disclosed invention is directed toward a clumping animal litter composition and a process of manufacturing the same. The litter is formed from cellulosic material that can be obtained from one or more sources of softwoods by any pelletizing process known in the art, for example the aforementioned method taught in U.S. Pat. No. 5,927,049 to the present inventors. During the formation of the pellets, the pellets are then moved across a sifting screen such that some of the cellulosic fines that separate from the pellets can be recycled as part of an mixture which includes an absorbent polymer (i.e. anionic polyacrylamide), dry powdered gum and grist. Alternatively, other sources of cellulosic fines generated from other manufacturing processes (e.g. lumber mill) can be used in the mixture.

It has been discovered by the present inventors that high molecular weight anionic polyacrylamides impart properties desirable in a clumping litter (i.e. faster clumping speed and clump hardness) as compared with lower molecular weight copolymers of acrylamide and acrylic acid (also known as acrylate), commonly used in the prior art. These high molecular weight macromolecules are known for their excellent absorptive capacity for aqueous media (e.g. typically upwards of 400× the weight of the polymer) with minimal tackiness.

Suitable absorbent polymers for use in the present invention include anionic polyacrylamides, a group of high charge density, water soluble, high molecular weight macromolecules produced through the polymerization of acrylamide and an anionically charged co-monomer, formed by any polymerization method known in the art. Some examples of anionically charged co-monomers include, sodium acrylate, potassium acrylate and other salts of acrylic acid and derivatives thereof known in the art.

The preferred anionic polyacrylamide is supplied under the designation CLEAROUT P6400 (manufactured by Chemtall Inc., GA, USA). CLEAROUT P6400 is a fine white powder with an approximate bulk density of 0.8 and viscosities of; 1800 cps @ concentration of 5.0 g/L; 700 cps @ concentration of 2.5 g/L; 300 cps @ 1.0 g/L, (as measured by a Brookfield viscometer at 25° C.). The intrinsic viscosity (IV) is about 22 dL/g. The dissolution time of the polymer in DI water @ 5 g/L, 25° C. is 60 minutes. The polymer has range of anionically charged co-monomers of about 20 to 40 mole %.

Examples of suitable gums or gum derivatives for use in the instant invention include guar gum. Particularly preferred guar gums include hydroxypropyl guar, carboxymethyl guar, carboxymethyl hydroxypropyl guar, and combinations and/or derivatives thereof known in the art. Other suitable gums include xanthan gum, locust bean gum and the like.

Accordingly, it is a principle objective of the instant invention to provide a clumping litter and process for the formation thereof providing a homogenous admixture of anionic polyacrylamide polymer, gum, grist and optionally, cellulosic fines, thereby providing a clumping litter with both enhanced absorption and clumping properties.

An additional objective of the invention is to produce a clump that is of sufficient hardness as to be readily removed by automated litter boxes, while able to readily disperse when introduced into the household plumbing system.

A further objective of the instant invention is to provide a manufacturing process whereby the litter produced makes use of the superfluous cellulosic fines created during the pelletization process that were heretofore unused, thereby providing a more economical and environmentally friendly product.

Another objective of the present invention is to provide an animal litter composition that has inherent odor controlling properties.

It is still a further objective of the invention to provide an animal litter composition and method of manufacture that employs industrial or agricultural byproducts, thereby providing an environmentally desirable litter.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

Figure 1:
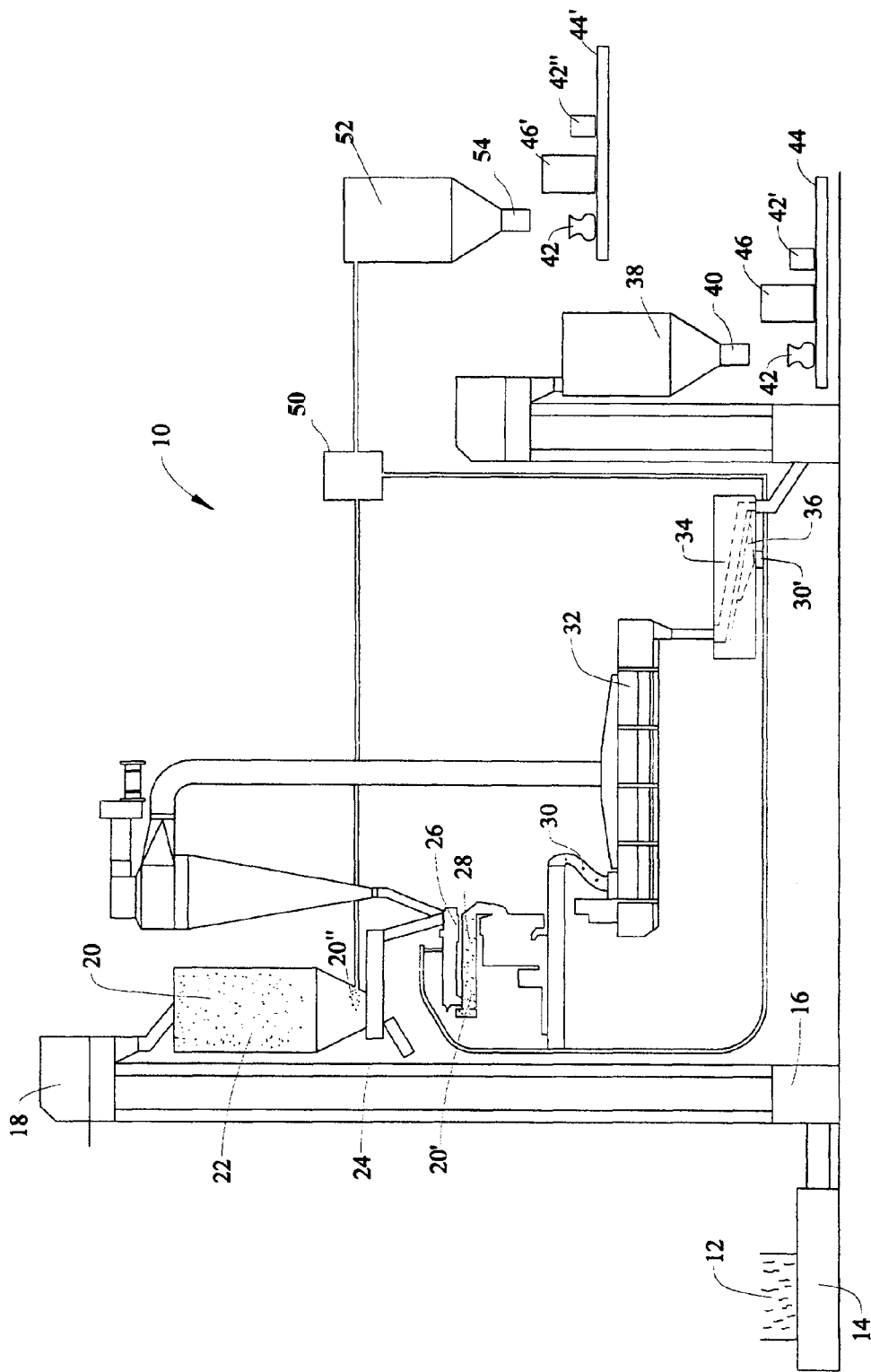
FIG. 1 is a schematic representation of a method for producing animal litter according to the present invention.

An illustrative, but non-limiting, example of a method that simultaneously manufactures both a non-clumping type organic fiber pellets and a clumping type organic for use as animal litter is illustrated in the schematic view 10 of FIG. 1. As described herein, the clumping type process depends upon the by-products generated during the manufacture of the non-clumping litter, however, the grist and cellulosic fines could be obtained from other independent sources which produce grist and suitably sized cellulosic fines, i.e. lumber yards. It is noted that other conventional pelletizing apparatus and methods may be utilized.

A preferred source of the cellulosic component, preferably, albeit not limited to, shavings of yellow pine wood 12 are delivered to a receiving depot 14 where it is off-loaded and placed into a kiln 16. Once in the kiln 16, the wood 12 is subjected to a temperature of about 120° F. to 200° F., at low consistent humidity, for a period of time, until the desired moisture level is achieved. The kiln 16 causes the wood 12 to reach uniform moisture content, preferably less than 8%. After the wood 12 has been cured, the material is transferred to a hammer mill 18 and ground into grist 20. The grist 20 is collected in a first surge chamber 22. The initial curing results in dimensional variances, produced by shrinkage during drying, and are eradicated during the grinding process. This results in a grist 20 that is uniform, evenly compressible, and conducive to holding a fixed shape. Additionally, the uniform nature of the grist 20 ensures that the pellets formed therefrom will bond well together.

The grist 20 is stored in the first surge chamber 22, until a portion of it is conveyed via a transfer feeder 24 to a conditioning chamber 26 to later form pellets 30. While the other portion of the grist 20" is transferred to a low shear mixer 50 for addition with gum, absorbent polymer and optionally cellulosic fines. The portion of the grist 20 that is transferred to the conditioning chamber 26 is sprayed with an aqueous solution, preferably steam, for approximately 3-4 seconds to form a grist 20 having uniform moisture content.

After being exposed to the aqueous solution, the moistened grist 20' flows into a pellet mill 28, where the moistened grist 20' is processed into a uniform pellet 30. During the pelletization process, the moistened grist 20' is exposed to increased pressure and temperature for a short period of time. More specifically, the moistened grist 20' is pressurized at about 60 Kpsi for approximately 4 to 10 seconds in the temperature range of about 180° F. to about 250° F.

The pellets 30 are then transferred to a cooler 32 where the pellet temperature drops to ambient temperature. This cooling step advantageously allows the pellets 30 to coalesce before further processing.

Once the pellets 30 have cooled, the pellets 30 pass through a shaker 34 having at least one sifting screen 36, (e.g. a 10-mesh screen), to remove any materials that did not form into a proper pellet. As the pellets 30 move across at least one sifting screen 36, the cellulosic fines 30' are separated from the pellets 30 for later addition as part of a mixture that is combined with the grist 20" in the low shear mixer 50. Optionally, a portion or all of the cellulosic fines 30' can be returned to the feeder 24 and mixed with grist 20 exiting from the first surge chamber 22. In this way, the returned fine particles 30' are combined with fresh grist 20 to form additional pellets 30.

Pellets 30 exiting the shaker construction 34 are collected in a second surge chamber 38, in preparation for bagging. From the second surge chamber 40, pellets are deposited into bags 42. The bags 42 travel on a bag conveyor 44 though a heat sealer 46 that closes the bags. The sealed bags 42' are then transported to remote location for sale and use as a non-clumping animal litter.

Into the low shear mixer 50 is added at least one dry powdered gum, preferably a guar gum or guar gum derivative, at a concentration of about 5.0% to 20.0% (wt/wt), preferably at about 10% (wt/wt) based on the weight of the mixture; a dry powder of the anionic polyacrylamide polymer at a concentration of about 0.1% to about 1.0% (wt/wt), preferably at about 0.3% (wt/wt), based on the weight of the mixture; a grist at a concentration of about 100% to 30% and recycled cellulosic fines 30' at about 0% to 70%, preferably about 30% (wt/wt), based on the weight of the mixture; such that the total percentage adds up to about 110%. The mixture can optionally contain any desired additive discussed below. After addition of the aforementioned components, the mixer 50 is run for a predetermined amount of time, at least 10 minutes, under conditions well known to those skilled in the art, in order to provide a uniform mixture.

The clumping litter mixture exiting the mixer 50 is collected in a third surge chamber 52, in preparation for bagging. From the third surge chamber 52, the mixture is released into a bagger unit 54, wherein the mixture is deposited into bags 42. The bags 42 travel on a bag conveyor 44' through a heat sealer 46' that closes the bags. The sealed bags 42" are then transported to remote locations for sale and use as animal litter. Although illustrated herein as two separate conveyors and sealers, it is contemplated that the same conveyor and/or sealer can be used in the manufacture of both the clumping and non-clumping litter.

Without limiting the scope of the present invention, suitable low shear mixers include drum mixers, cement mixers, auger mixers, vibrating bed mixer or other means of mixing known in the art. These can be batch or continuous feed mixers.

It is contemplated by the instant invention to provide at least one additive during the mixing step described above, at about 0% to about 20% of the weight of the mixture. Non-limiting examples of additives include, but are not limited to oils or extracts of fragrances, antimicrobial agents, deodorants, disinfectants, colorants (i.e. pigments, dyes, lakes), and combinations thereof. Other suitable additives include oxidizers, such as sodium perborate and/or calcium peroxide, to neutralize the volatile odors (i.e. mercaptan, amines, skatole gases) emitted from the waste. Addition of at least one of the aforementioned additives during the formation of the pellet would produce pellets that comprise the characteristics of the additive throughout, e.g. color, fragrance, etc.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A clumping animal litter composition for forming substantially solid clumps upon contact with an aqueous solution comprising in combination: at least one absorbent polymer in amounts between about 0.1% to about 1.0% by weight based on the total weight of the mixture; at least one gum in amounts between about 5.0% to about 20.0% by weight based on the total weight of the mixture; and a grist; wherein said at least one absorbent polymer, said at least one gum and said grist are supplied in amounts sufficient to form a homogenous mixture.

2. The clumping animal litter composition according to claim 1, wherein each said at least one absorbent polymer contains an anionic polyacrylamide comprising an acrylamide and an anionically charged co-monomer, wherein said anionically charged co-monomer includes at least one salt of acrylic acid.

3. The clumping animal litter composition according to claim 1, wherein each said absorbent polymer contains an anionic polyacrylamide with an average molecular weight of about 5,000,000 to about 30,000,000.

4. The clumping animal litter composition according to claim 3, wherein said anionic polyacrylamide has an average molecular weight of about 10,000,000.

5. The clumping animal litter composition according to any one of claim 1, claim 2, claim 3 or claim 4, wherein said anionic polyacrylamide is provided in amounts of about 0.3% by weight based on the total weight of said mixture.

6. The clumping animal litter composition according to claim 1, wherein said grist is obtained from at least one source of softwood.

7. The clumping animal litter composition according to claim 6, wherein said softwood is at least one selected from the group consisting of yellow pine, lodge pole pine, cedar and combinations thereof.

8. The clumping animal litter composition according to claim 1, wherein said at least one gum is selected from the group consisting of hydroxypropyl guar, carboxymethyl guar, carboxymethyl hydroxypropyl guar, xanthan gum, and locust bean gum, including derivatives and combinations thereof.

9. The clumping animal litter composition according to any one of claim 1, or claim 8 wherein said gum is provided at about 10.0% by weight based on the total weight of said mixture.

10. The clumping animal litter composition according to claim 1 wherein said mixture further comprises an additive selected from the group consisting of a biocide, antimicrobial, deodorants, disinfectants, colorants, fragrance, oxidizer and combinations thereof.

11. A clumping animal litter composition for forming substantially solid clumps upon contact with an aqueous solution comprising in combination:
at least one absorbent polymer in amounts between about 0.1% to about 1.0% by weight based on the total weight of the mixture;
at least one gum in amounts between about 5.0% to about 20.0% by weight based on the total weight of the mixture;
cellulosic fines in amounts up to about 70% by weight based on the total weight of said mixture; and
a grist;
wherein said at least one absorbent polymer, said at least one gum and said grist are supplied in amounts sufficient to form a homogenous mixture.

12. A process for producing a clumping animal litter composition for forming solid clumps upon contact with a liquid, comprising the steps of:
(a) drying at least one source of cellulosic material to a uniform moisture content;
(b) grinding said cellulosic material in a mill to form a grist;
(c) forming at least a portion of said grist into pellets;
(d) separating said pellets from any cellulosic fines;
(e) combining said cellulosic fines in amounts between about 0% to about 70% by weight based on the total weight of the mixture, grist in amounts between about 30% to about 100% concentration based on the total composition of the mixture, said at least one gum in amounts between about 5% to about 20% by weight based on the total weight of the mixture, and said at least one absorbent polymer in amounts between about 0.1% to about 1% by weight based on the total weight of the mixture utilizing a low-shear mixer; whereby a clumping animal litter is formed.

13. The process according to claim 12, wherein said separating step further comprises screening said cellulosic fines through at least one 10-mesh screen.

14. The process according to claim 12, wherein said combining step includes the addition from about 30% to about 70% by weight of said cellulosic fines based on the total weight of said mixture.

15. The process according to claim 12, wherein said low-shear mixer is selected from the group consisting of a ribbon blender, tumble blender cement mixer, auger mixer, fluid bed mixer, spray tower, vibrating bed mixer.

16. The process according to claim 12, wherein an additive selected from the group consisting of a biocide, anti-microbial, deodorant, disinfectant, colorant, fragrance, oxidizer and combinations thereof, is added along any step (a) to (e).

17. The process according to claim 12, wherein said at least one gum is selected from the group consisting of hydroxypropyl guar, carboxymethyl guar, carboxymethyl hydroxypropyl guar, xanthan gum, and locust bean gum, including derivatives and combinations thereof.

18. The process according to claim 12, wherein said at least one absorbent polymer contains an anionic polyacrylamide comprising an acrylamide and an anionically charged co-monomer, wherein said anionically charged co-monomer includes at least one salt of acrylic acid.

* * * * *